United States Patent [19]

Eylon et al.

[11] Patent Number: 4,893,743
[45] Date of Patent: Jan. 16, 1990

[54] METHOD TO PRODUCE SUPERPLASTICALLY FORMED TITANIUM ALUMINIDE COMPONENTS

[75] Inventors: Daniel Eylon, Dayton; Francis H. Froes, Xenia, both of Ohio

[73] Assignee: The United States of America as represented by the Secretary of the Air Force, Washington, D.C.

[21] Appl. No.: 349,471

[22] Filed: May 9, 1989

[51] Int. Cl.⁴ .................... B23K 20/00; B23K 20/22
[52] U.S. Cl. ..................................... 228/181; 228/190; 228/193; 228/234; 228/263.21
[58] Field of Search ............... 228/265, 181, 190, 193, 228/199, 227, 234, 263.21

[56] References Cited

U.S. PATENT DOCUMENTS

| | | | |
|---|---|---|---|
| 4,087,037 | 5/1987 | Schier et al. | 228/106 |
| 4,117,970 | 10/1978 | Hamilton et al. | 228/173 |
| 4,197,977 | 4/1980 | Deminet | 228/106 |
| 4,220,276 | 9/1980 | Weisert et al. | 228/193 |
| 4,292,077 | 9/1981 | Blackburn et al. | 75/175 |
| 4,294,419 | 10/1981 | Fouse et al. | 224/117 |
| 4,406,393 | 9/1983 | Ascani, Jr. et al. | 228/190 |
| 4,471,028 | 9/1984 | Kimura et al. | 428/593 |
| 4,499,156 | 2/1985 | Smith et al. | 228/193 |
| 4,500,583 | 2/1985 | Naul | 528/116 |
| 4,614,220 | 9/1986 | Savage | 164/461 |
| 4,631,221 | 12/1986 | Disselbeck et al. | 428/166 |
| 4,733,816 | 3/1988 | Eylon et al. | 228/263.21 |
| 4,746,374 | 5/1988 | Froes et al. | 148/11.5 |

Primary Examiner—Nicholas P. Godici
Assistant Examiner—Samuel M. Heinrich
Attorney, Agent, or Firm—Charles E. Bricker; Donald J. Singer

[57] ABSTRACT

Processes for producing titanium aluminide SPF/DB components, particularly structural panels, are provided. In one embodiment, the process comprises providing rapidly solidified titanium aluminide alloy sheetstock, providing a plurality of rapidly solidified titanium aluminide alloy ribbons or strips, forming the ribbons into waveform structures, assembling a plurality of these waveform structures to produce a honeycomb core, positioning this core between face sheets, and bonding the core to the face sheets. In another embodiment, the process comprises providing rapidly solidified titanium aluminide alloy sheetstock, superplastically forming at least one piece of sheetstock into a shaped piece having spaced apart, parallel bonding regions, positioning this shaped piece between two face sheets, and bonding the shaped piece to each face sheet. In yet another embodiment, the process comprises providing rapidly solidified titanium aluminide alloy sheetstock, applying a diffusion bond-inhibiting material in a desired pattern to at least one piece of sheetstock, assembling the sheetstock having the bond-inhibiting pattern thereon with at least one further piece of sheetstock, diffusion bonding this assembly, and superplastically forming the bonded assembly by introducing an inert gas into the region defined by the bond-inhibiting material.

15 Claims, 5 Drawing Sheets

METHOD TO PRODUCE SUPERPLASTICALLY FORMED TITANIUM ALUMINIDE COMPONENTS

RIGHTS OF THE GOVERNMENT

The invention described herein may be manufactured and used by or for the Government of the United States for all governmental purposes without the payment of any royalty.

BACKGROUND OF THE INVENTION

The present invention relates to processes for fabricating structural units from ordered titanium-aluminum base alloys.

Pure titanium is relatively soft, weak and extremely ductile. Through additions of other elements, the base metal is converted to an engineering material having unique characteristics, including high strength and stiffness, corrosion resistance and usable ductility, coupled with low density.

Titanium is allotropic. In unalloyed titanium, up to about 785° C., the atoms arrange themselves in a hexagonal close-packed crystal array called alpha phase. When titanium is heated above the transition temperature (beta-transus) of about 785° C., the atoms rearrange into a body-centered cubic structure called beta phase. The addition of other elements to a titanium base will generally favor one or the other of the alpha or beta forms and will increase or decrease the beta-transus temperature.

Titanium-aluminum base alloys containing about 10 to 50 atomic percent Al and about 80 to 50 atomic percent Ti in addition to other alloying elements have been recognized for some time. These alloys are ordered and divided into two major groups: the alpha-2 alloys based on the intermetallic compound $Ti_3Al$, and the gamma alloys based on the intermetallic compound TiAl. There also exists a class of alloys containing a mixture of the alpha-2 and beta phases. These alloys are referred to as titanium aluminides and have good high temperature strength and oxidation and creep resistance, but are relatively brittle and difficult to process and fabricate at room temperature.

Titanium alloys are widely used in aerospace applications due to the characteristics listed previously. Titanium alloys have been fabricated into useful shapes by forging, extrusion, rolling, drawing, casting and powder metallurgy. In recent years, a fabrication technique known as superplastic forming (SPF), with or without concurrent diffusion bonding (DB), has achieved a certain prominence. This process makes it possible to form titanium alloys in a simple manner with significant reduction in parts such as fasteners, thereby permitting the fabrication of airframe and engine structures with significant cost and weight reduction.

The production of titanium aluminide SPF/DB components requires sheets and foils with uniform and fine grain structure. Such fine grain structure can require multi-step and expensive thermomechanical and/or thermochemical processing to convert ingot material into sheets and foils.

Attempts to roll titanium aluminides into sheetstock thinner than about 0.5 mm have proved to be very difficult and expensive. Consequently, researchers wishing to employ these alloys have often resorted to chemical milling or grinding of sheetstock in order to provide foil of desired thickness, typically about 0.1 to 0.3 mm, thereby greatly increasing material cost.

Sandwich panels, such as lightweight core laminate panels, have the advantage over conventional construction materials that they combine a low weight per unit area with exceptional flexural rigidity and good vibration damping. Such panels conventionally consist of two relatively thin outer covering layers of a hard, firm and rigid material. These two covering layers are joined together by a relatively thick core which consists of a light and less rigid material. The bond between the core and the covering layers must be sufficiently strong that no detachment of the covering layer from the core occurs upon application of a force.

Accordingly, it is an object of the present invention to provide a process for producing titanium aluminide SPF/DB components.

Other objects, aspects and advantages of the invention will be apparent to those skilled in the art from a reading of the following detailed disclosure.

SUMMARY OF THE INVENTION

In accordance with the present invention, there are provided processes for producing titanium aluminide SPF/DB components, particularly structural panels.

In one embodiment of the invention, there is provided a process for producing honeycomb-core structural panels which comprises the steps of:
 (a) providing rapidly solidified titanium aluminide sheetstock, as hereinafter defined;
 (b) providing a plurality of rapidly solidified titanium aluminide ribbons or strips, as hereinafter defined;
 (c) forming said ribbons into waveform structures;
 (d) assembling a plurality of these waveform structures to produce a honeycomb core;
 (e) positioning this core between two pieces of sheetstock, i.e., face-sheets; and
 (f) bonding the core to each piece of sheetstock.

In accordance with another embodiment of the invention, there is provided a process for producing structural panels which comprises the steps of:
 (a) providing rapidly solidified titanium aluminide sheetstock, as hereinafter defined;
 (b) superplastically forming at least one piece of sheetstock into a shaped piece having spaced apart, parallel bonding regions;
 (c) positioning this shaped piece between two pieces of sheetstock: and
 (d) bonding the shaped piece to each piece of sheetstock.

In accordance with yet another embodiment of the invention, there is provided a process for producing structural panels which comprises the steps of:
 (a) providing rapidly solidified titanium aluminide sheetstock, as hereinafter defined;
 (b) applying a diffusion bond-inhibiting material in a desired pattern to at least one piece of sheetstock;
 (c) assembling the sheetstock having the bond-inhibiting pattern thereon with at least one further piece of sheetstock;
 (d) diffusion bonding the assembly resulting from step (c); and,
 (e) superplastically forming the bonded assembly resulting from step (d) by introducing an inert gas into the region defined by the bond-inhibiting material.

DESCRIPTION OF THE PREFERRED EMBODIMENT

Titanium-aluminum alloys suitable for use in the present invention are those alloys containing about 10 to 50 atomic percent aluminum and about 80 to 50 atomic percent titanium. These alloys are known collectively as titanium aluminides. In addition, the Ti-Al alloy may contain varying amounts of other elements, such as, for example, Nb, Mo, V and W. Examples of titanium aluminide alloys (with compositions shown in atomic percentages) include Ti-48Al, Ti-15.8Al, Ti-24Al-11Nb, Ti-25Al-10Nb-3Mo-1V, Ti-48Al-2W, Ti-48Al-2Ta, Ti-48Al-2Nb and Ti-48Al-2Mn.

As used herein and in the claims, the term foil is intended to mean a sheet-like material, generally rectangular, having a thickness of about 10 to 150 microns, generally about 10 to 100 microns. The term sheetstock is intended to mean a sheet-like material, generally rectangular, having a thickness of about 150 microns to about 3 mm.

Several techniques are known for producing rapidly-solidified foil, including those known in the art as Chill Block Melt Spinning (CBMS), Planar Flow Casting (PFC), Melt Drag (MD), Crucible Melt Extraction (CME), Melt Overflow (MO) and Pendant Drop Melt Extraction (PDME). Typically, these techniques employ a cooling rate of about $10^4$ to $10^7$ deg-K/sec and produce a material about 10 to 100 microns thick, with an average beta grain size of about 2 to 20 microns, which is substantially smaller than the beta grain size produced by ingot metallurgy methods. The foils produced using these techniques can range in width from about 1 mm to 150 mm or greater.

Sheetstock may be fabricated by consolidating a plurality of layers of rapidly solidified foil by diffusion bonding the foil using a flat platen press. Consolidation of the foil layers into sheetstock is accomplished by the application of heat and pressure over a period of time to cause solid state diffusion bonding. Consolidation is typically carried out at a temperature about 25° to 300° C. below the beta-transus temperature of the titanium aluminide. For example, the consolidation of a plurality of foils of Ti-24Al-11Nb alloy, which has a beta-transus temperature of about 1120° C. is preferably carried out at about 925° C. The pressure required for consolidation ranges from about 10 to about 300 MPa (about 1.5 to 40 ksi) and the time for consolidation ranges from about 15 minutes to about 24 hours or more. Consolidation under these conditions allows retention of the fine grain size of the alloy. Wider and thicker foil may be similarly fabricated.

Figure 1:
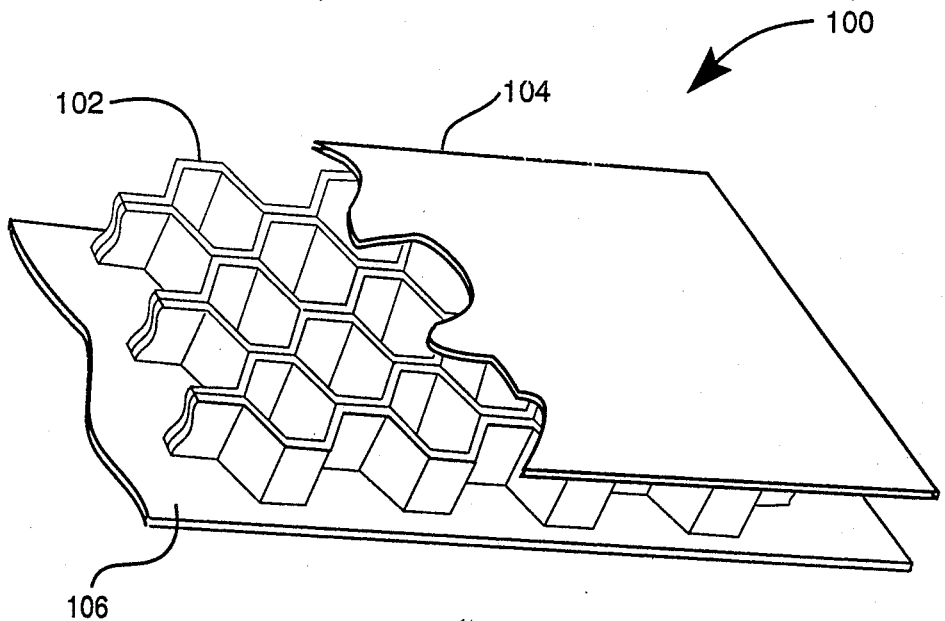
FIG. 1 is a perspective view, partly cut away, of a first structural panel in accordance with the invention.
Figure 3:
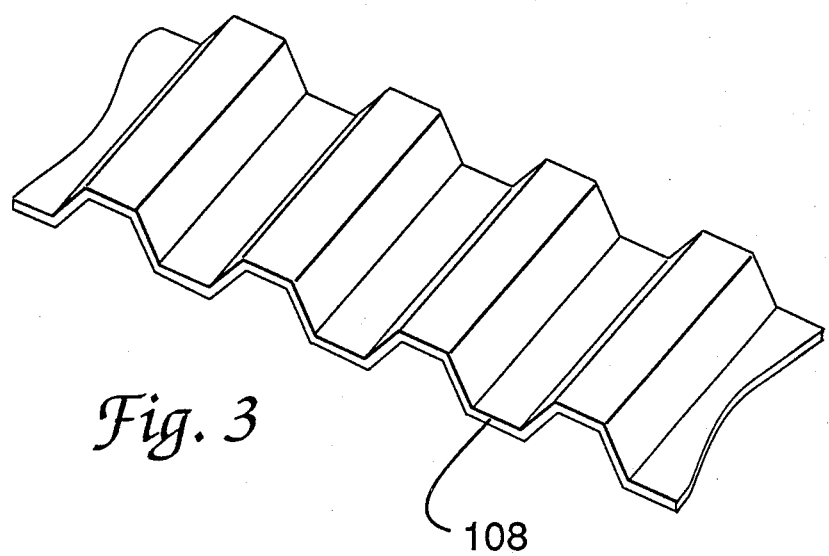
FIG. 3 is a perspective view of a corrugated thin strip of titanium aluminide used to fabricate the honeycomb core of FIG. 2.
Figure 4:
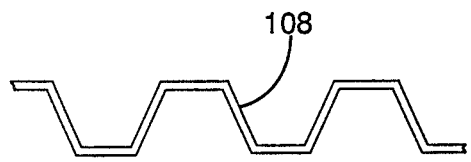
FIG. 4 is an end elevational view of the corrugated strip of FIG. 3.
Figure 6:
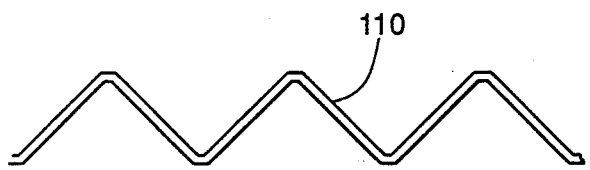
FIGS. 6 and 8 are views similar to FIG. 4, but illustrating alternative waveform embodiments.
Figure 7:
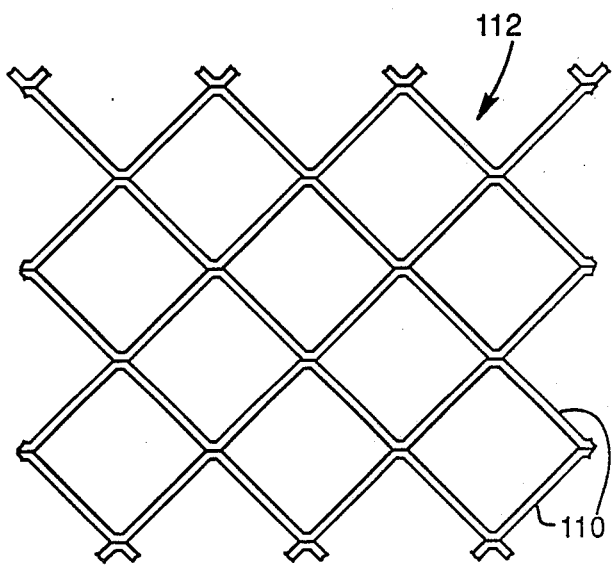
FIGS. 7 and 9 are views similar to FIG. 5, but illustrating alternative embodiments of honeycomb cores formed of the units of FIGS. 6 and 8, respectively.
Figure 8:
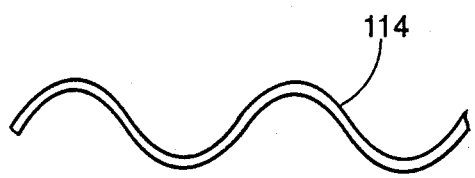
Figure 9:
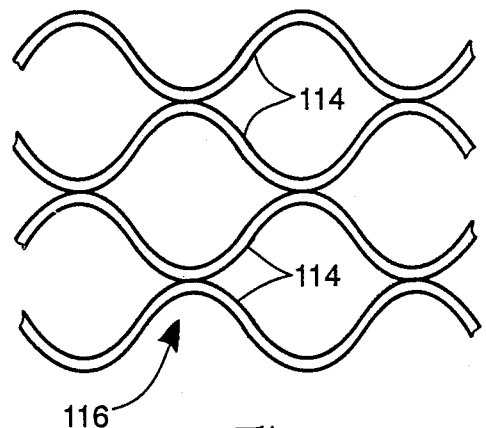

Referring now to the drawings, FIG. 1 illustrates a structural panel 100 comprising a honeycomb core 102 sandwiched between skin materials 104 and 106. The honeycomb core 102 is fabricated from a plurality of corrugated moldings 108 as shown in FIG. 3. These moldings may be formed using foil and sheetstock of suitable width. Rapidly-solidfied foil producing techniques such as PFC and MD may be employed to directly produce foil of desired width. Alternatively, wider material may be slit to a desired width. The corrugated molding 108 may take various waveforms, e.g., a sawtooth 110, as shown in FIGS. 6 and 7 or a sinewave 114, as shown in FIGS. 8 and 9.

The corrugated moldings 108 can be cold formed using a press mold having complementary shaped dies. It is preferable to hot form the moldings 108 using a vacuum hot press at a temperature about 25° to 300° C. below the beta transus temperature of the alloy.

Figure 2:
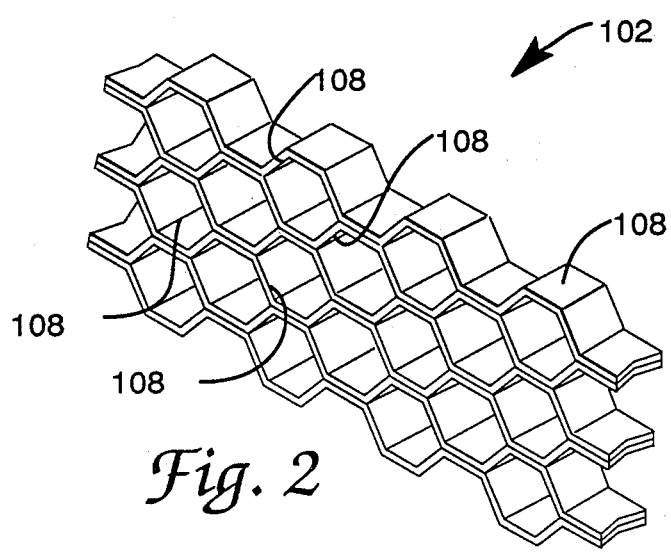
FIG. 2 is a perspective view of a honeycomb core of the structural panel of FIG. 1.
Figure 5:
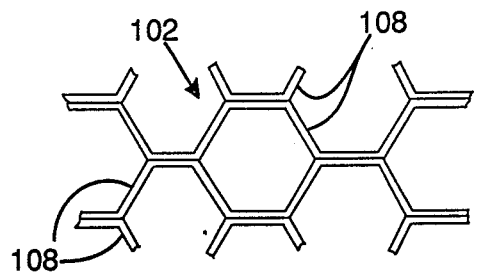
FIG. 5 is an end elevational view of the honeycomb core of FIG. 2.

A plurality of the corrugated moldings 108 are then arranged as shown in FIGS. 2 and 5 and sandwiched between skin materials 104 and 106 as shown in FIG. 1. The resulting sandwich is diffusion bonded using a vacuum hot press equipped with flat platens at a temperature about 25° to 300° C. below the beta transus temperature of the alloy at a bonding pressure of about 10 to 300 MPa for about 15 minutes to 24 hours or more. After this diffusion bonding is completed, the press is allowed to return to ambient temperature and atmospheric pressure.

For ease in handling, the corrugated moldings 108 can be arranged as shown in FIGS. 5 and joined together by diffusion bonding under the bonding conditions given above. Alternatively, the moldings 108 can be joined together using a fugitive thermoplastic binder, such as polystyrene. If a fugitive binder is used, the binder must be removed prior to bonding the core to the skin sheets. By utilizing a press equipped with heatable platens and a vacuum chamber surroundng at least the platens and press ram(s), removal of the binder and diffusion bonding may be easily accomplished. Heat is applied gradually under vacuum to cleanly off-gas the fugitive binder without pyrolysis occurring. After bonding temperature is reached, pressure is applied.

The waveforms shown in FIGS. 6 and 8 may be arranged as shown in FIGS. 7 and 9, respectively, to fabricate other honeycomb cores.

Figure 10:
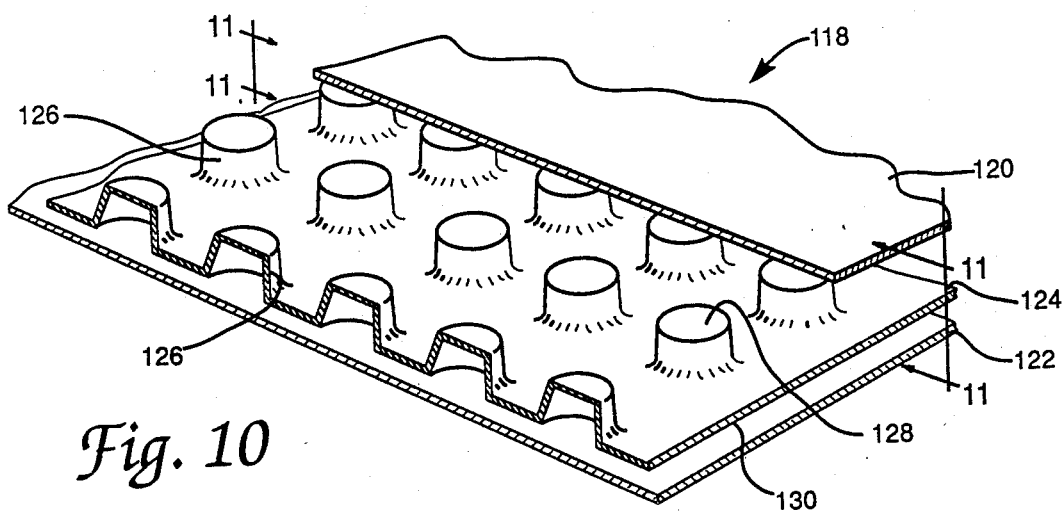
FIG. 10 is a perspective view, partly cut away, of a second structural panel in accordance with the invention.
Figure 11:
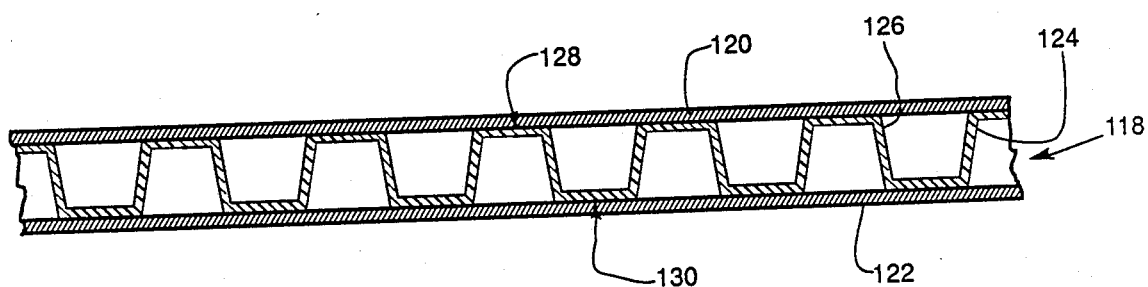
FIG. 11 is a view through section 11—11 of FIG. 10.

FIGS. 10 and 11 illustrate another structural panel in accordance with the invention. The panel 188 consists essentially of cover sheets or skins 120 and 122 and a core 124. The core 124 is a shaped structure having a plurality of spaced apart wells or cup-like projections 126. The wells 126 are provided by superplastic forming rapidly solidfied material using a press mold having complementary shaped dies at a temperature about 25° to 300° C. below the beta transus temperature of the alloy at a shaping pressure of about 10 to 300 MPa for about 15 minutes to 24 hours or more. The superplastic forming creates new surfaces 128 which lie in a plane parallel to the original plane 130 of the sheet-like structure. The bonding surfaces between the core 124 and the cover sheet 120 are the surfaces 128, and the bonding surfaces between the core 124 and the cover sheet 122 are the remaining residual surfaces 130. The cover sheets 120 and 122 are diffusion bonded to the core 124 using the temperature, pressure and time conditions given previously.

Figure 12:
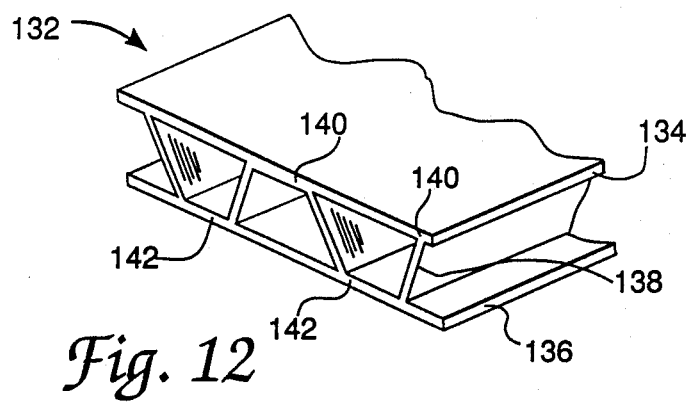
FIG. 12 is a perspective view of a third structural panel in accordance with the invention.
Figure 13:
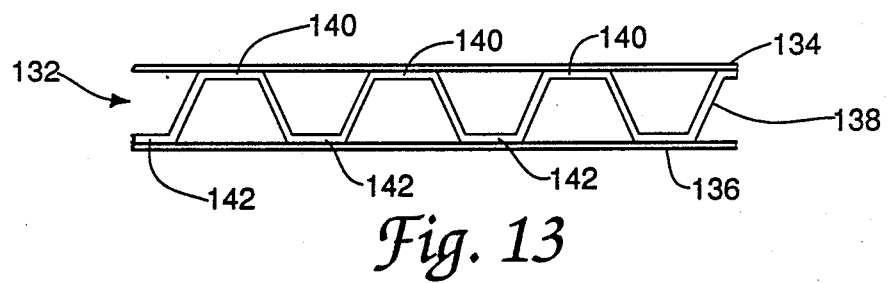
FIG. 13 is an end elevational view of the panel shown in FIG. 12.
Figure 14:
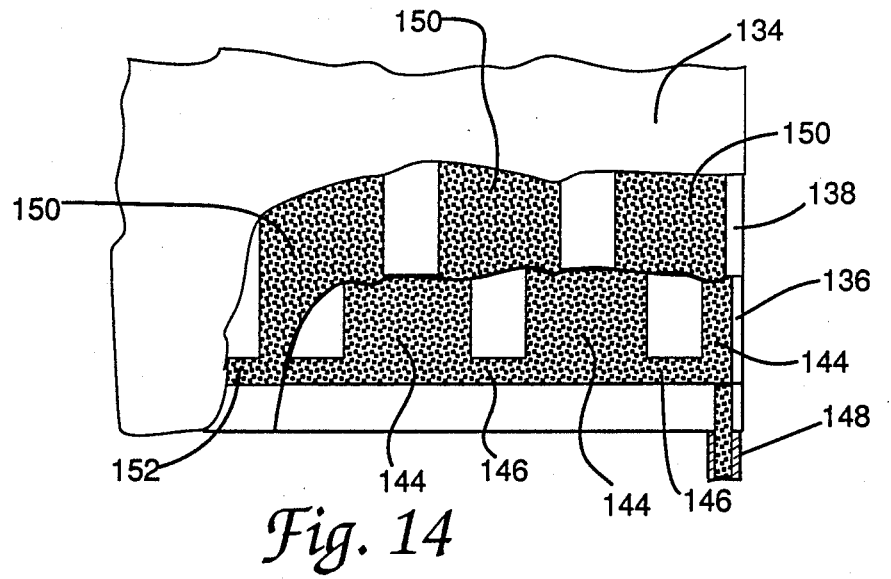
FIG. 14 illustrates the arrangement of parts with patterned coatings thereon for superplastic forming/diffusion bonding of sheets to form the structural panel of FIG. 12.

FIGS. 12–14 illustrate yet another structural panel in accordance with the invention. Panel 132 is a straight truss consisting essentially of cover sheets or skins 134 and 136 and corrugated truss member 138 having a plurality of parallel upper and lower bonding regions 140 and 142, respectively.

Panel 132 is fabricated from three sheet-like units of rapidly solidified material. A diffusion bond inhibiting material, such as boron nitride, is applied, such as by silk screening, to two of these units. In FIG. 14 a pattern is shown on cover sheet 136 in which coated areas 144 are parallel and spaced apart. The ends of the coated areas 144 are joined together by a coated area 146 which forms a manifold to supply an inert gas to the coated areas 144 for expansion by superplastic forming. Fitting 148, made from a suitable metal, such as stainless steel, is provided to supply the inert gas to the manifold area 146. Sheet 138, which after superplastic forming becomes truss member 138, is provided with similar parallel and spaced apart coated areas 150 and a coated area 152 which likewise forms a manifold. A fitting, not shown, like fitting 148, is provided to supply an inert gas to manifold area 152. The pattern coated onto sheet 138 is offset from the pattern coated onto sheet 136 by one-half the pitch or wavelength of the desired corrugation of sheet 138.

After the desired pattern is coated onto sheets, the sheet members are stacked and placed in a hot press. Diffusion bonding is carried out within the press under the conditions given previously to bond the sheets together in those areas which are free of the bond inhibiting coating. Pressure on the press platens is reduced as an inert gas, such as argon or helium, is introduced through fittings 148 to superplastically form the truss member 138. The moderate inert gas pressure developed for superplastic forming is maintained throughout the diffusion bonding process. After this diffusion bonding is completed, the supply of inert gas is terminated and the press is allowed to return to ambient temperature and atmospheric pressure.

Figure 15:
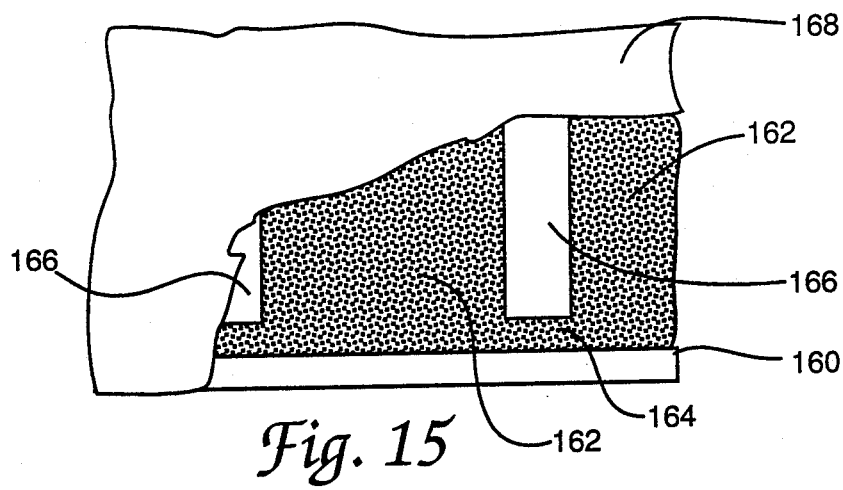
FIGS. 15–17 illustrate the fabrication of another structural panel.
Figure 16:
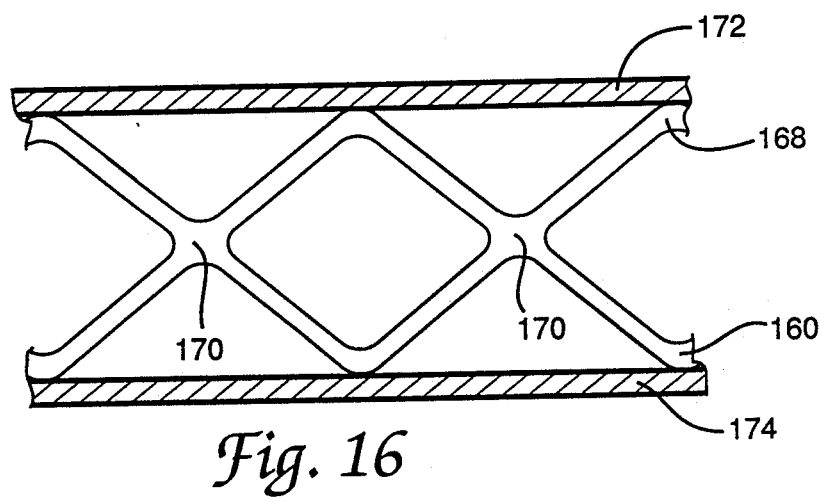
Figure 17:
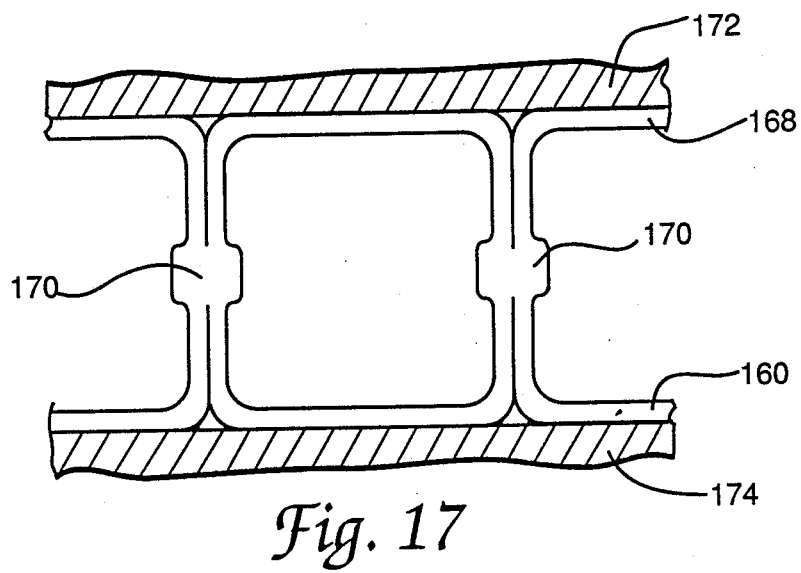

FIGS. 15–17 illustrate the fabrication of another panel using the method described above. Referring to Figure 15, a bond inhibiting coating is applied to a piece of sheetstock 160 in a pattern consisting of a plurality of relatively wide, longitudinally extending coated regions 162 and a manifold region 164, as described previously. Between the coated regions 162 are relatively narrow uncoated regions 166. A second piece of sheetstock 168 is stacked over the piece 160. The resulting, unbonded assembly is provided with a fitting, not shown, like fitting 148 of FIG. 14. The unbonded assembly is placed in a hot press and diffusion bonding between pieces 160 and 168 is carried out in the uncoated regions 166. Pressure on the press platens is then reduced as an inert gas is introduced through the fitting(s) to superplastically form the assembly. FIG. 16 illustrates the assembly after diffusion bonding and during superplastic forming. The uncoated regions 166 of piece 160 are bonded with piece 168 to form bonded regions 170. Inert gas pressure, supplied through manifold region 164 to coated regions 162 cause the sheetstock to expand outwardly against the press platens 172 and 174. Referring to FIG. 17, further opening of the press platens 172 and 174 is halted at a predetermined opening height and the pieces 160 and 168 are further expanded to fill the rectangular void defined by the press platens 172 and 174. The moderate inert gas pressure developed for superplastic forming is maintained throughout the process. The vacuum applied to the press is maintained throughout the process. After the diffusion bonding and superplastic forming is completed, the supply of inert gas is terminated and the press is allowed to return to ambient temperature and atmospheric pressure. The resulting panel may be employed as fabricated or may be diffusion bonded to sheetstock on one or both sides.

The advantages of the present invention are that the requirements for multi-step and expensive thermomechanical processing for converting ingot material into sheetstock and foil with a desireable, generally uniform and equiaxed grain structure, are now unnecessary. The combination of rapid solidification processing with subsequent processing which retains a uniform and fine grain microstructure in the titanium aluminides leads to lower cost, higher integrity SPF/DB structures.

Various modifications may be made to the invention as described without departing from the spirit of the invention or the scope of the appended claims.

We claim:

1. A method for producing a titanium aluminide honeycomb-core structural panel which comprises the steps of:
   (a) forming a plurality of rapidly solidified titanium aluminide strips into waveform structures;
   (b) assembling a plurality of said waveform structures to produce a honeycomb core;
   (c) positioning said core between two cover pieces of rapidly solidified titanium aluminide sheetstock; and
   (d) diffusion bonding said core to each of said cover pieces.

2. The method of claim 1 wherein said sheetstock is fabricated from rapidly solidified foil by diffusion bonding a plurality of layers of foil under bonding conditions which permit retention of the uniform and fine grain microstructure of said rapidly solidified foil.

3. The method of claim 2 wherein said strips are sheetstock.

4. The method of claim 1 wherein said strips are relatively thick foil fabricated from relatively thin rapidly solidified foil by diffusion bonding a plurality of layers of said relatively thin rapidly solidified foil under bonding conditions which permit retention of the uniform and fine grain microstructure of said relatively thin rapidly solidified foil.

5. The method of claim 1 wherein said waveform structures are joined together during assembly to produce said honeycomb core.

6. The method of claim 5 wherein said waveform structures are joined together by diffusion bonding.

7. The method of claim 5 wherein said waveform structures are joined together by a fugitive thermoplastic binder material and wherein said fugitive binder is removed prior to bonding said core to said cover pieces.

8. The method of claim 1 wherein diffusion bonding is carried out at a temperature about 25° to 300° C. below the beta-transus temperature of said titanium aluminide at a pressure of about 10 to about 300 MPa for about 15 minutes to about 24 hours or more.

9. A method for producing a titanium aluminide structural panel which comprises the steps of:
(a) depositing a patterned coating of bond-inhibiting material onto at least one face surface of at least one sheet of rapidly solidified titanium aluminide sheetstock to provide a pattern-coated sheet;
(b) assembling said pattern-coated sheet with at least one other sheet of rapidly solidified titanium aluminide sheetstock to provide a non-bonded assembly;
(c) diffusion bonding said non-bonded assembly to provide a bonded assembly; and
(d) introducing an inert gas into the region defined by said bond-inhibiting material to superplastically form said panel.

10. The method of claim 9 wherein said sheetstock is fabricated from rapidly solidified foil by diffusion bonding a plurality of layers of foil under bonding conditions which permit retention of the uniform and fine grain microstructure of said rapidly solidified foil.

11. The method of claim 9 wherein superplastic forming and diffusion bonding is carried out at a temperature about 25° to 300° C. below the bela-transus temperature of said titanium aluminide at a pressure of about 10 to about 300 MPa for about 15 minutes to about 24 hours or more.

12. A method for producing a titanium aluminide structural panel which comprises the steps of:
(a) superplastically forming at least one sheet of rapidly solidified titanium aluminide sheetstock into a shaped piece having a plurality of spaced apart, parallel bonding regions;
(b) positioning said shaped piece between two sheets of rapidly solidified titanium aluminide sheetstock to provide a non-bonded assembly; and
(c) diffusion bonding said non-bonded assembly to provide a bonded assembly.

13. The method of claim 12 wherein said sheetstock is fabricated from rapidly solidified foil by diffusion bonding a plurality of layers of foil under bonding conditions which permit retention of the uniform and fine grain microstructure of said rapidly solidified foil.

14. The method of claim 12 wherein superplastic forming and diffusion bonding is carried out at a temperature about 25° to 300° C. below the beta-transus temperature of said titanium aluminide at a pressure of about 10 to about 300 MPa for about 15 minutes to about 24 hours or more.

15. The method of claim 12 wherein said shaped piece comprises a plurality of spaced apart wells.

* * * * *